US008850914B2

(12) United States Patent
Reisch et al.

(10) Patent No.: US 8,850,914 B2
(45) Date of Patent: Oct. 7, 2014

(54) DUAL CLUTCH GEAR MECHANISM WITH A COUNTERSHAFT DESIGN FOR A VEHICLE WITH CENTRAL SYNCHRONIZATION

(75) Inventors: Matthias Reisch, Ravensburg (DE); Gerhard Gumpoltsberger, Friedrichshafen (DE); Eckardt Lübke, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 773 days.

(21) Appl. No.: 12/921,742

(22) PCT Filed: Feb. 20, 2009

(86) PCT No.: PCT/EP2009/052009
§ 371 (c)(1),
(2), (4) Date: Oct. 25, 2010

(87) PCT Pub. No.: WO2009/112339
PCT Pub. Date: Sep. 17, 2009

(65) Prior Publication Data

US 2011/0036187 A1 Feb. 17, 2011

(30) Foreign Application Priority Data

Mar. 13, 2008 (DE) ......................... 10 2008 000 645

(51) Int. Cl.

| | |
|---|---|
| ***F16H 3/08*** | (2006.01) |
| ***F16H 61/688*** | (2006.01) |
| ***F16D 65/14*** | (2006.01) |
| ***F16H 63/30*** | (2006.01) |
| *F16H 3/097* | (2006.01) |
| *F16D 125/28* | (2012.01) |
| *F16H 3/093* | (2006.01) |
| *F16H 3/12* | (2006.01) |
| *F16H 61/04* | (2006.01) |

(52) U.S. Cl.
CPC .............. *F16H 61/688* (2013.01); *F16H 3/097* (2013.01); *F16D 2125/28* (2013.01); *F16H 2003/0931* (2013.01); *F16H 2003/123* (2013.01); *F16D 65/14* (2013.01); *F16H 2306/48* (2013.01); *F16H 2200/0056* (2013.01); *F16H 63/3003* (2013.01); *F16H 2061/0411* (2013.01); *F16H 61/0403* (2013.01)
USPC ............................................ 74/330; 188/7 R

(58) Field of Classification Search
CPC ......... F16D 55/36; F16D 55/28; F16D 49/00; F16D 41/00
USPC ............................................................ 74/330
See application file for complete search history.

(56) References Cited

U.S. PATENT DOCUMENTS 698,262 A * 4/1902 Crowdus ..................... 188/77 R
715,231 A * 12/1902 Crowdus ..................... 188/77 R (Continued)

FOREIGN PATENT DOCUMENTS

DE 19627895 C1 2/1998
DE 10206561 A1 10/2002

(Continued)

OTHER PUBLICATIONS

International Search Report for International Application No. PCT/EP2009/052009, dated Sep. 22, 2009, 5 pages.

(Continued)

*Primary Examiner* — Troy Chambers
*Assistant Examiner* — Zakaria Elahmadi
(74) *Attorney, Agent, or Firm* — Brinks Gilson & Lione

(57) ABSTRACT

The invention relates to a dual clutch gear mechanism with a countershaft design for a vehicle with central synchronisation, in which a braking device is provided for slowing down each partial gear mechanism and a band brake (1,2) is provided as a braking device.

10 Claims, 3 Drawing Sheets

(56) References Cited

U.S. PATENT DOCUMENTS

Figure 1:
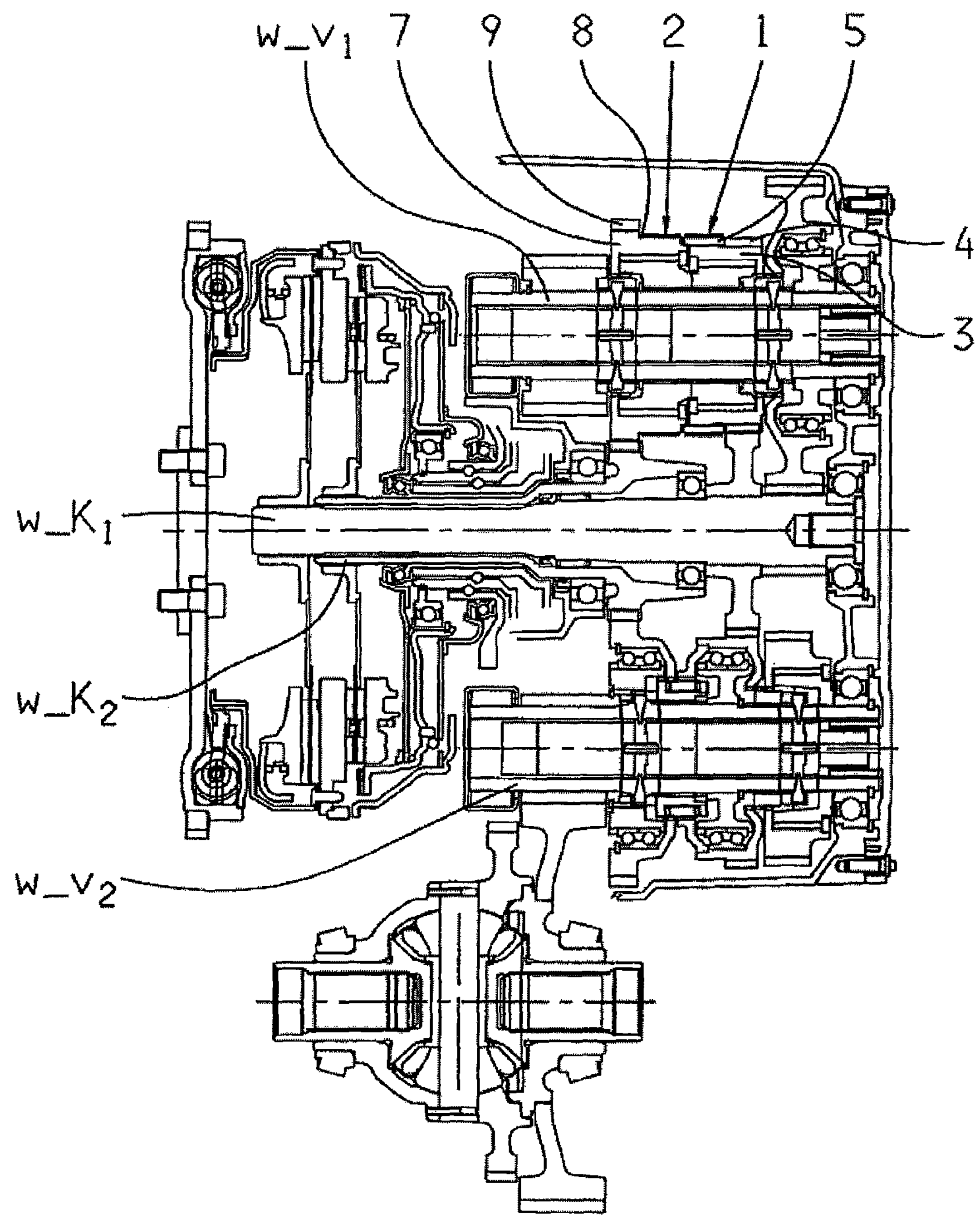

| | | | | |
|---|---|---|---|---|
| 1,121,222 | A * | 12/1914 | Alexander | 188/77 R |
| RE15,302 | E * | 3/1922 | Rundle | 188/77 R |
| 1,642,230 | A * | 9/1927 | Davis | 74/665 H |
| 1,701,505 | A * | 2/1929 | Perrot | 188/106 A |
| 2,660,264 | A * | 11/1953 | Richardson | 188/77 R |
| 2,958,231 | A * | 11/1960 | Gerst | 74/360 |
| 3,034,600 | A * | 5/1962 | Berno | 188/77 R |
| 3,184,006 | A * | 5/1965 | Fox | 188/77 R |
| 3,820,636 | A * | 6/1974 | Kass | 88/77 R |
| 3,863,738 | A * | 2/1975 | Molloy | 188/77 R |
| 4,053,032 | A * | 10/1977 | McDonald | 188/77 R |
| 4,217,974 | A * | 8/1980 | Holcomb, Jr. | 188/77 R |
| 4,384,637 | A * | 5/1983 | Runkle | 188/77 R |
| 4,493,479 | A * | 1/1985 | Clark | 254/274 |
| 4,891,959 | A * | 1/1990 | Wood | 68/23.7 |
| 4,892,360 | A * | 1/1990 | Tysver | 303/9.61 |
| 5,131,509 | A * | 7/1992 | Moon et al. | 188/77 R |
| 5,246,093 | A * | 9/1993 | Wang | 188/336 |
| 6,766,705 | B1 | 7/2004 | Hall, III | |
| 6,948,596 | B2 * | 9/2005 | Van Wouw | 188/77 W |
| 7,093,511 | B2 * | 8/2006 | Norum et al. | 74/335 |
| 7,798,030 | B2 * | 9/2010 | Lang et al. | 74/331 |

FOREIGN PATENT DOCUMENTS

| | | | |
|---|---|---|---|
| DE | 10225331 | A1 | 12/2003 |
| DE | 10243278 | A1 | 3/2004 |
| EP | 1400731 | A2 | 3/2004 |
| WO | WO 2004/036085 | A2 | 4/2004 |

OTHER PUBLICATIONS

International Preliminary Report on Patentability for International Application No. PCT/EP2009/052009, dated Oct. 5, 2010, 10 pages.

* cited by examiner

DUAL CLUTCH GEAR MECHANISM WITH A COUNTERSHAFT DESIGN FOR A VEHICLE WITH CENTRAL SYNCHRONIZATION

This application is a filing under 35 U.S.C. §371 of International Patent Application PCT/EP2009/052009filed Feb. 20, 2009, which claims priority to Germany Application No. 10 2008 000 645.9 , filed Mar. 13, 2008, each of which is incorporated by reference herein in its entirety.

The present invention concerns a double clutch transmission in countershaft gear design for a vehicle using central synchronization according to the type described in the preamble of Claim 1.

In automotive engineering, several multi-speed power transmissions are known. Usually, the double clutch transmission comprises two clutches, each of which has an input side that is connected with the drive shaft and an output side that is connected with one of the two transmission input shafts, respectively. Both transmission input shafts are arranged coaxially to each other. Furthermore, two counter shafts are arranged axially parallel to both transmission input shafts, and the idle wheels of the counter shafts mesh with fixed wheels of the transmission input shafts. In the case of the double clutch transmission, the gears are principally designed for, or situated in the transmission part through which the power flows. The gears are engaged by means of synchronizations each of which is assigned to the idle wheel to be switched.

Pamphlet DE 102 43 278 A1 discloses a device for synchronizing a double clutch transmission, in particular for a motor vehicle. The device basically consists of a brake assembly comprising two transmission input axle brakes. In addition, both transmission parts are attached to adjustable synchronizing mechanisms for speed synchronization. The synchronizing mechanisms are designed as friction rings which come into contact with the respective shift collar when the axial shift bar is displaced. As a result, during a switching operation, the faster axle is decelerated in relation to the slower axle. To support the process of synchronization, the transmission input axle brakes are assigned to each transmission part. The axle brakes can be controlled by means of a control unit and can produce the friction, i.e., the deceleration of the respective axle, required for synchronization. However, the provided transmission input axle brakes and the synchronizing mechanisms require considerable additional installation space.

Furthermore, pamphlet DE 102 25 331 A1 discloses a power shift transmission using central synchronization in countershaft gear design. In the power shift transmission, central synchronization takes place, which means that usually the other control units can have an unsynchronized design. For this purpose, two control elements are designed as powerful synchronizing mechanisms, a process which is cost-intensive and requires extensive installation space.

The present invention is based on the objective of proposing a double clutch transmission of the type described above, which is equipped with cost-effective transmission brakes requiring only little installation space.

According to the invention, this objective is achieved through the characteristics of Claim 1. Additional advantageous embodiments are shown in the sub-claims and the drawings.

Accordingly, a double clutch transmission in countershaft gear design is proposed for a motor vehicle using central synchronization, which comprises a brake assembly for decelerating each transmission part, in which the brake assembly consists of a respective band brake, or the like.

To use band brakes as brake assemblies is especially cost-effective because they basically comprise a bent strip made of sheet metal or a similar material to which a suitable friction lining consisting, for example, of paper soaked in resin has been applied or glued. However, it is also possible to use band brakes with different designs. For example, it is possible to use band brakes with a single loop or with several loops, in which the ends are attached, for example, with riveted band connectors, or the like. Preferably, the looping angle can be approximately 300° in case of a single loop, and approximately 700° in case of a double loop. There can also be several looping angles.

To use band brakes as transmission brakes has the important advantage that band brakes are considerably lighter than customary synchronizations. Consequently, the band brake produces almost no additional mass moment of inertia at the assigned gear. The elimination of the otherwise required synchronizations results in a considerably lower mass moment of inertia in the entire system. Especially in cases in which the double clutch transmissions are equipped with so-called internal switch mechanisms, the band brakes can be housed in double clutch transmissions irrespective of the overall length.

In the invention-based double clutch transmission, depending on the application, the band brakes can be arranged on one of the countershafts and/or on one of the transmission input shafts. It is also possible to mount one band brake on a countershaft and the other band brake on a transmission input shaft. Preferably, the band brakes can be assigned at least to one idle wheel of the countershafts and/or to one fixed wheel of the transmission input shafts. Depending on the design, the band brakes can be arranged in coaxial manner to the associated shafts. Preferably, the band brakes can also be arranged in axial manner next to each other. However, it is also possible to use any other arrangement.

In the context of a preferred design variant, it is possible, for example, to assign a first band brake to the idle wheel for the sixth gear of the first transmission part and a second band brake to the idle wheel for the fifth, or seventh, gear of the second transmission part. As a result, each transmission part is provided with a band brake. In another structural design of the double clutch transmission, the band brakes can also be associated with different idle wheels.

Preferably, the band brakes can be operated at least by means of an electrical, electro-mechanic, hydraulic, electro-hydraulic, and/or pneumatic actuator. It is also possible to provide for both band brakes a mutual actuator which allows the band brakes to be controlled independent from each other. However, it is also possible to use separate actuators for the band brakes.

According to one possible embodiment, the actuator can consist of a piston-cylinder device. Consequently, the brake band of the respective band brake can be tightened or released through the piston stroke, making it possible to change the brake action in any desired way. Advantageously, the actuator can comprise also an electromotive unit, making it possible to change the brake action electrically.

Independent of the type and kind of actuation, it can be arranged that the actuator or the brake band of the band brake is provided with a resetting element to guarantee that there is clearance at the brake band. The resetting element used can comprise, for example, a return spring, or the like. It is also possible to use different resetting elements.

A possible embodiment of the invention can arrange that the respective band brake is activated by means of a lever element, or the like, that is hinged at the operable end of the brake band of the band brake. In this way, the actuator which, for example, is designed as a piston-cylinder device, can form an operative connection with the lever element in order to trigger the lever element to tighten or release the brake band. The fixed end of the brake band of the band brake can be attached in any manner to the housing.

Another possibility of forming an operative connection between the band brake and the actuator can be realized by providing, for the purpose of activating the band brake, a first eccentric shaft having at least one eccentric section, or the like, to which an operative end of the brake band of the band brake is hinged. The fixed end of the band brake can be secured in the housing, for example, by means of a bearing bolt, or the like. To activate a further, or second, band brake, the fixed end is attached to a further eccentric shaft comprising an eccentric section. On the other hand, the fixed end of the second band brake is attached to a non-eccentric shaft section of the first eccentric shaft. This joint attachment reduces the number of required installation components. Moreover, the use of eccentric shafts for activation is cost-effective because they can be easily produced, for example, from formed wires.

When using eccentric shafts, the band brakes are activated by respectively rotating the eccentric shafts. With a respective mechanism, the rotation of the eccentric shaft can be realized by using piston-cylinder devices as actuators. However, it is also possible to use different actuators.

In the case of activating the band brakes by means of eccentric shafts, it is possible to use, for example, a central bearing unit to hold the ends of the brake bands of the band brakes. However, it is also possible to use separate bearing units. The central bearing unit can comprise at least one base, or the like, having sockets for receiving the assigned ends of the eccentric shafts and the bearing bolt.

Each of the ends of the brake bands can comprise, for example, a lifting strap, which is designed in such a way that the eccentric shaft or the bearing bolt can be passed through it. In this way, each end of a brake band can be easily connected with the associated shaft. However, the end of the brake end and the associated shaft can also be connected in any other way.

With regard to the number of gears and the structural arrangement of the individual components, the proposed double clutch transmission using central synchronization can have any possible design. It is preferred to use a double clutch transmission with jaw clutch, because besides the load-shiftable gears the double clutch transmission provides also winding paths which can be operated through an internal, as well as external, switch mechanism. However, it is possible to provide also other transmissions with the invention-based central synchronization using band brakes.

Figure 2:
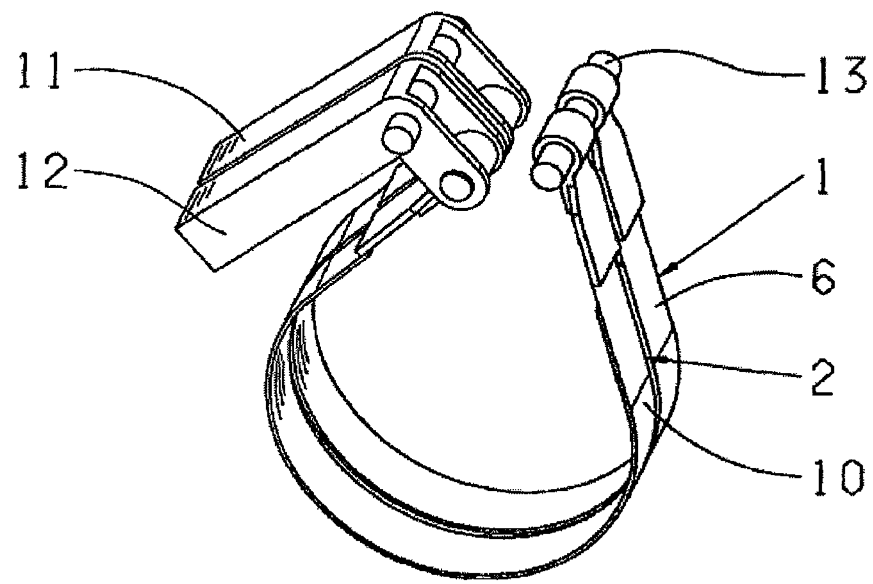
Figure 3:
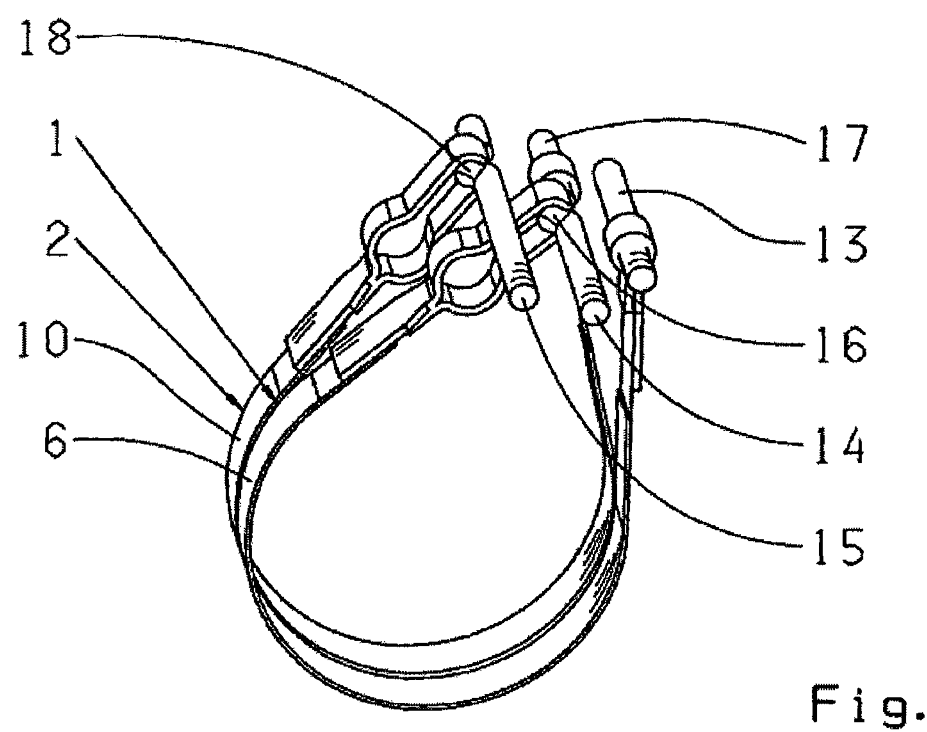
Figure 4:
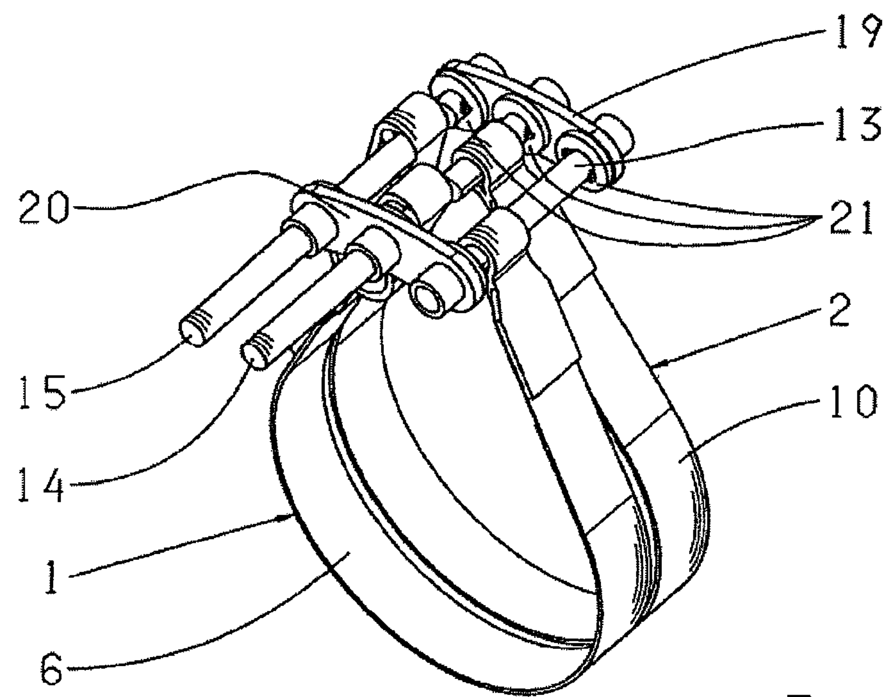
Figure 5:
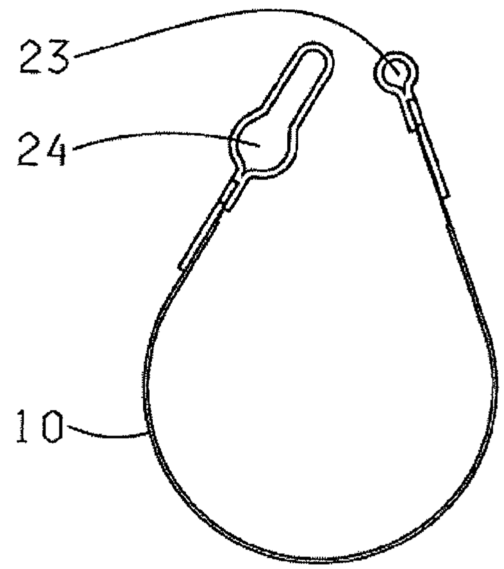

Subsequently, the present invention is described in more detail by means of the drawing, providing corresponding components with the same reference numerals in the figures. It is shown:

FIG. 1 A sectional view of a schematic diagram of an exemplary double clutch transmission having central synchronization;

FIG. 2 A detailed, three-dimensional diagram of band brakes according to a first design variant of the invention-based double clutch transmission;

FIG. 3 A detailed, three-dimensional diagram of band brakes according to a second design variant of the invention-based double clutch transmission;

FIG. 4 A further detailed, three-dimensional diagram of band brakes according to a second design variant of the invention-based double clutch transmission;

FIG. 5 A three-dimensional diagram of a braked band of a band brake; and

Figure 6:
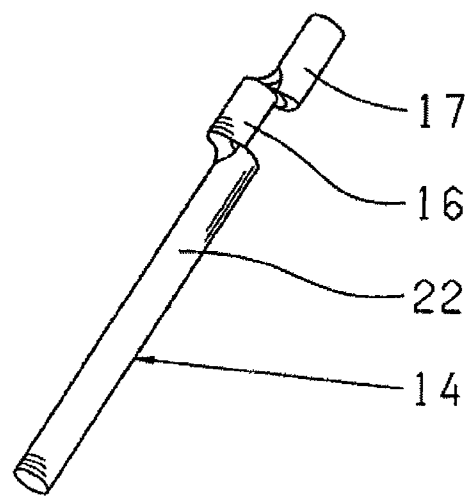

FIG. 6 A three-dimensional diagram of an eccentric shaft of the band brake shown in the second design variant of the invention-based double clutch transmission.

FIG. 1 shows an exemplary sectional view of a multi-speed double clutch transmission. The double clutch transmission is designed as a jaw clutch transmission with central synchronization and comprises two clutches the input sides which are connected with a drive shaft. In addition, a torsion vibration damper is attached to the drive shaft. The output sides of the clutches are connected with one of two transmission input shafts w_K1, w_K2, respectively, which are coaxially arranged to each other. The first transmission input shaft w_K1 has been designed as a solid shaft and the second transmission input shaft w_K2 as a hollow shaft. Furthermore, two counter shafts w_v1, w_v2 have been provided with have been arranged in axially parallel manner to one another. Each counter shaft w_v1, w_v2 is provided with several idle wheels, which engage to fixed wheels on the transmission input shafts w_K1, K_v2.

To be able to operate the idle wheels of the respective transmission input shaft w_v1, w_v2, several internally activated shift devices have been provided at each counter shaft w_v1, w_v2. Apart from switching the load-shiftable gears, the transmission input shafts w_K1, w_K2 can also be interconnected in order to provide the double clutch transmission with winding paths.

Independent of the respective design variant, the double clutch transmission comprises a brake assembly for decelerating each transmission part. According to the invention, a first band brake 1 is associated with the first transmission part, and a second band brake 2 is associated with second transmission part. In the process, the band brakes 1, 2 can be connected in such a way that each band brake 1, 2 is assigned either directly or indirectly to a transmission input shaft_K1, w_K2, which means that one band brake 1, 2, respectively, can decelerate one of the transmission parts. In this way, the transmission part that is not powered can be decelerated by means of the assigned band brake 1, 2, in order to be able to perform the respective switching operation in central synchronized manner.

As shown in FIG. 1, the first band brake 1, which is assigned to the first transmission part, can be provided at an idle wheel 3 for the sixth gear of the first counter shaft w_v1. For this purpose, the idle wheel 3 has a cylindrical section 5 that is provided in axial direction next to the gearing 4. The brake band 6 of the first band brake 1 rests, at east partially, on the peripheral region of the cylindrical section.

The second band brake 2, which is assigned to the second transmission part, is provided at an idle wheel 7 for the fifth or seventh gear of the second counter shaft w_v1. For this purpose, the idle wheel 7 has a radial grading 8 next to the gearing 9 of the idle wheel 7. The brake band 10 of the second band brake 2 rests, at least partially, on the peripheral region of the grading 8. As a result, it is possible, if necessary, to decelerate the idle wheel 3 and, consequently, the first transmission part, as well as the idle wheel 7 and, consequently, the second transmission part.

FIG. 2 shows a first possible design variant of the double clutch transmission having band brakes 1, 2 that are activated by means of a lever element 11, 12. Independent of the respective design variant, each band brake 1, 2 comprises a brake band 6, 10 to which a suitable friction lining has been applied. Each brake band 6, 10 has a fixed end, which is located in the housing, and an operable end, which is in operative connection with an actuator (not shown), for the purpose of tightening and releasing the brake band 6, 10 in order to achieve a respective brake action at the assigned idle wheel 3, 7. The respective end of the brake band 6, 10 has a lifting strap which, in turn, has an opening which is designed to receive respective attachments.

In the first design variant according to FIG. 2, each lever element 11, 12 is coupled with an actuator which is designed, for example, as a piston-cylinder device. By respectively moving the lever element 11, 12, or the operable end, the brake band 6, 10 of the band brake 1, 2 is tightened or released.

The fact that both band brakes 1, 2 are controlled separately from each other, that is, not simultaneously, makes a joint control possible. However, it is also possible to have separate controls. By means of their respective lifting straps, the fixed ends of both band brakes 1, 2 are attached to a bearing bolt 13 situated in the housing.

FIGS. 3 to 6 show different views of a second design variant of the double clutch transmission, having band brakes 1, 2 that are activated by means of eccentric shafts 14, 15. In the second design variant, a first eccentric shaft 14 having at least one eccentric section 16 has been provided for activating the first band brake 1. An operative end of the brake band 6 of the first band brake 1 is hinged to said eccentric section 16. The fixed end of the brake band 6 of the first band brake 1 is attached to the housing by means of a bearing bolt 13. Furthermore, for activating the second band brake 2, the fixed end of the brake band 10 of the second band brake 2 is mounted to a non-concentric shaft section 17 of the first eccentric shaft 14. The operable end of the brake band 10 of the second band brake 2 is hinged to an eccentric section 18 of the second eccentric shaft 15, whereas the eccentric section 18 of the second eccentric shaft 15 has been arranged offset in axial direction in relation to the approximately coaxial eccentric section 16 of the first eccentric shaft 14.

By rotating the first eccentric shaft 14 about an actuator (not shown), the brake band 6 of the first band brake 1 can be tightened or released. And if the second eccentric shaft 15 is rotated about an actuator (not shown), the brake band 10 of the second band brake 2 can be tightened or released.

FIG. 4 shows a possibility of supporting the two eccentric shafts 14, 15 and the bearing bolt 13. The support comprises a central bearing unit consisting of two bases 19, 20 arranged in parallel to one another, which have respective sockets for receiving the associated ends of the eccentric shafts 14, 15 and the bearing bolt 13. Furthermore, several axial washers 21 are arranged preferably on both sides of the bases 19, 20 opposite of the respective ends of the shafts. The bearing unit shown allows for a compact arrangement which requires only little installation space. However, it is also possible to use separate support systems.

FIG. 5 shows an exploded view of the brake band 10 with the exemplary lifting straps. In contrast to brake band 6, the lifting straps of brake band 10 are designed differently. At the fixed end of the brake band 10, a basically circular opening 23, which has been adjusted to the bearing bolt 13, has been provided at the lifting strap. The opening 23 has a diameter that is slightly larger than the diameter of the bearing bolt 13. However, at the operable end of the brake band 10, the lifting strap has an elongated opening 24 which expands in the direction of the brake band 10. The expanding region of the opening 24 is calculated in such a way that the eccentric shaft can be passed through in axial direction. In the brake band 6 of the first band brake 1, both lifting straps are provided with an approximately circular opening 23.

Finally, FIG. 6 shows an exemplary exploded view of the first eccentric shaft 14. The eccentric shafts 14 and 15 can be produced at least partially as forming parts. The first eccentric shaft 14 has a coaxial eccentric section 16, as well as two shaft sections 17, 22 in non-eccentric design. In contrast to the first eccentric shaft 14, the second eccentric shaft 15 has an eccentric section 18 that is arranged eccentrically on the second eccentric shaft 15.

Independent of whether the band brakes 1, 2 are activated by means of a lever element 11, 12 or by means of eccentric shafts 14, 15, an actuation on the input side of the brake band 6, 10 requires self-enforcement and thus lower braking force, making the band brake 1, 2 more sensitive to frictional coefficients. If the actuation is performed on the output side of the brake band 6, 10, no self-enforcement takes place, which requires higher braking forces, whereas the band brake 1, 2 is less sensitive to frictional coefficients. As a result, it is possible to control the braking power.

Reference Numerals
1 first band brake
2 second band brake
3 idle wheel of the sixth gear
4 gearing
5 cylindrical section
6 brake band of the first band brake
7 idle wheel of the fifth gear
8 grading
9 gearing
10 brake band of the second band brake
11 lever element
12 lever element
13 bearing bolt
14 first eccentric shaft
15 second eccentric shaft
16 eccentric section of the first eccentric shaft
17 non-eccentric shaft section
18 eccentric section of the second eccentric shaft
19 base
20 base
21 axial washer
22 non-eccentric shaft section
23 basically circular recess
24 basically elongated recess
w-K1 first transmission input shaft
w-K2 second transmission input shaft
w-v1 first counter shaft
w-v2 second counter shaft

The invention claimed is:

1. A centrally synchronized double clutch transmission comprising:

a housing;

at least two transmission input shafts;

a first countershaft and a second countershaft; and a brake assembly configured to decelerate the transmission input shafts, wherein the brake assembly comprises at least two band brakes arranged axially adjacent to each other, and about the first countershaft, wherein each band brake comprises at least one brake band and the band brakes are configured to be operated at least by means of an electrical, electro-mechanic, hydraulic, electro-hydraulic, and/or pneumatic actuator;

a first eccentric shaft having at least one eccentric section configured to activate a first band brake of the at least two band brakes, wherein said eccentric section of the first eccentric shaft is hinged to an operative end of the brake band of the first band brake and a fixed end of the brake band of the first band brake is attached to the housing at a bearing bolt; and a second eccentric shaft having at least one eccentric section configured to activate a second band brake of the at least two band brakes wherein a fixed end of the brake band of the second band brake is attached to a non-eccentric shaft section of the first eccentric shaft, and an operable end of the brake band of the second band brake is hinged to the eccentric section of the second eccentric shaft.

2. The double clutch transmission according to claim 1, wherein the actuator comprises a piston-cylinder device.

3. The double clutch transmission according to claim 1, wherein the actuator comprises an electromotive unit.

4. The double clutch transmission according to claim 1, further comprising a resetting element provided for each actuator or brake band of the respective band brake.

5. The double clutch transmission according to claim 1, wherein each band brake is activated by a lever element that is hinged at an operable end of the brake band of each band brake and a fixed end of the brake band of each band brake is attached to the housing.

6. The double clutch transmission according to claim 1, further comprising a bearing unit configured to support the eccentric shafts and bearing bolt.

7. The double clutch transmission according to claim 6, wherein the bearing unit comprises at least one base having sockets for receiving ends of the eccentric shafts and the bearing bolt.

8. The double clutch transmission according to claim 1, wherein at least one of the ends of at least one brake band comprises a lifting strap having a substantially circular opening configured to accept a bearing bolt.

9. The double clutch transmission according to claim 1, wherein the fixed end of each brake band comprises a lifting strap having a substantially circular opening configured to accept the bearing bolt or non-eccentric section of one of the eccentric shafts, and the operable end of each brake band comprises a lifting strap having an elongated opening configured to accept an eccentric section of one of the eccentric shafts.

10. The double clutch transmission according to claim 1, wherein at least one band brake is configured to decelerate each of the at least one transmission input shafts directly or indirectly.

* * * * *